US011303582B1

(12) United States Patent
Losito (10) Patent No.: US 11,303,582 B1
(45) Date of Patent: Apr. 12, 2022

(54) MULTI-LAYER NETWORK FOR METRIC AGGREGATION

(71) Applicant: Amazon Technologies, Inc., Seattle, WA (US)

(72) Inventor: Marco Losito, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/456,896

(22) Filed: Jun. 28, 2019

(51) Int. Cl.
*H04L 12/911* (2013.01)
*H04L 47/70* (2022.01)
*H04L 69/322* (2022.01)
*H04L 67/10* (2022.01)

(52) U.S. Cl.
CPC .............. *H04L 47/82* (2013.01); *H04L 67/10* (2013.01); *H04L 69/322* (2013.01)

(58) Field of Classification Search
CPC ........ H04L 47/82; H04L 47/10; H04L 69/322
See application file for complete search history.

(56) References Cited

U.S. PATENT DOCUMENTS

| | | | | |
|---|---|---|---|---|
| 6,625,161 | B1* | 9/2003 | Su | H04L 69/14 370/415 |
| 8,978,034 | B1* | 3/2015 | Goodson | G06F 16/21 718/101 |
| 8,996,541 | B2* | 3/2015 | Kall | H04L 41/0226 707/752 |
| 9,209,934 | B2* | 12/2015 | Luby | H04L 65/604 |
| 9,621,384 | B2* | 4/2017 | Sivakumar | H04L 45/24 |
| 10,038,741 | B1* | 7/2018 | Judge | H04L 12/4633 |
| 11,070,600 | B1* | 7/2021 | Mercier | H04L 65/4069 |
| 2002/0004843 | A1* | 1/2002 | Andersson | H04L 45/00 709/238 |
| 2004/0250059 | A1* | 12/2004 | Ramelson | H04L 63/0428 713/150 |
| 2006/0153232 | A1* | 7/2006 | Shvodian | H04L 69/324 370/468 |
| 2008/0280623 | A1* | 11/2008 | Danne | H04L 65/1006 455/453 |

(Continued)

OTHER PUBLICATIONS

Soren Henning et al., Scalable and Reliable Multi-Dimensional Aggregation of Sensor Data Streams, IEEE International Conference on Big Data, pp. 1-6, 2019.*

(Continued)

*Primary Examiner* — Michael Won
(74) *Attorney, Agent, or Firm* — Klarquist Sparkman, LLP (57) ABSTRACT

A multi-layered parallel aggregation can be performed on large-scale metric streams using layers of independent host server computers that perform partial aggregations on results of a previous layer and pass a result of the partial aggregation to a next layer of host server computers, until a single host server computer in a last layer can calculate a final output, which is a combination of the partial aggregations. Because every layer is aggregating input streams, the quantity of data exchange lowers as the layer number increases. The number of layers is chosen so as to ensure that data ingested by a last layer is sufficiently manageable that a single host server computer in the last layer can aggregate all of the partial aggregates into a final result.

17 Claims, 9 Drawing Sheets

(56) References Cited

U.S. PATENT DOCUMENTS

| | | | | |
|---|---|---|---|---|
| 2011/0010461 | A1* | 1/2011 | Lassila | H04L 12/1403 |
| | | | | 709/231 |
| 2012/0197852 | A1* | 8/2012 | Dutta | H04L 67/12 |
| | | | | 707/692 |
| 2012/0197856 | A1* | 8/2012 | Banka | H04L 67/2885 |
| | | | | 707/706 |
| 2012/0197898 | A1* | 8/2012 | Pandey | G06F 16/2264 |
| | | | | 707/741 |
| 2012/0197911 | A1* | 8/2012 | Banka | G06F 16/951 |
| | | | | 707/752 |
| 2013/0325823 | A1* | 12/2013 | Resch | G06F 21/33 |
| | | | | 707/695 |
| 2016/0036716 | A1* | 2/2016 | Pal | H04L 67/2804 |
| | | | | 709/207 |
| 2018/0048731 | A1* | 2/2018 | Yeager | H04L 69/22 |
| 2018/0089278 | A1* | 3/2018 | Bhattacharjee | H04L 43/08 |
| 2018/0285718 | A1* | 10/2018 | Baum | G06N 20/00 |
| 2020/0106828 | A1* | 4/2020 | Elias | G06F 9/3885 |
| 2020/0117664 | A1* | 4/2020 | Kondiles | G06F 16/278 |
| 2020/0169479 | A1* | 5/2020 | Ireland | H04L 47/6215 |
| 2020/0196377 | A1* | 6/2020 | Fang | H04L 61/6022 |
| 2020/0380695 | A1* | 12/2020 | Zhou | G06T 7/0012 |
| 2021/0021653 | A1* | 1/2021 | Mercier | H04L 67/26 |
| 2021/0029060 | A1* | 1/2021 | Lam | H04L 47/34 |

OTHER PUBLICATIONS

Data aggregation processes: a survey, a taxonomy, and design guidelinesCai, Simin; Gallina, Barbara; Nyström, Dag; Seceleanu, Cristina. Computing. Archives for Informatics and Numerical Computation 101.10: 1397-1429. Wien: Springer Nature B.V. (Oct. 2019) (Year: 2019).*

* cited by examiner

MULTI-LAYER NETWORK FOR METRIC AGGREGATION

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Some cloud environments provide monitoring services that monitor the computing resources and applications being run. As a result, a large number of data streams can be generated that include data, such as timing (how long to perform a task), load (how much a resource is being used), rates (a number of times an event occurred over a predetermined time period), etc. The monitoring services can use the received metric data to gain system-wide visibility into resource utilization, application performance and operational health.

Aggregations of the data streams into a single representation can be useful in analyzing the data streams.

DETAILED DESCRIPTION

Aggregation of data streams into a single stream can overwhelm hardware performing the aggregations, especially in large cloud environments wherein potentially hundreds of thousands of related streams are aggregated. An aggregation system is needed that allows for scaling and aggregation of any number of streams. A multi-layered parallel aggregation can be performed on large-scale metric streams using layers of independent host server computers that perform partial aggregations on results of a previous layer and pass a result of the partial aggregation to a next layer of host server computers, until a single host server computer in a last layer can calculate a final output, which is a combination of the partial aggregations. Because every layer is aggregating input streams, the quantity of data exchange lowers as the layer number increases. The number of layers is chosen so as to ensure that data ingested by a last layer is sufficiently manageable that a single host server computer in the last layer can aggregate all of the partial aggregates into a final result. Each layer includes host server computers coupled in parallel to one of the previous layers. Each layer can perform a partial aggregation without the need for a shared memory mechanism or any other centralized entity. A first layer, called layer 0, receives a large-scale amount of raw data. The raw data can include a plurality of different metrics that can be used in different aggregations based on predetermined rules associated with the aggregation. The aggregations can be combinations of the metrics from different streams, such as a mathematical combination (e.g., an average or medium), a count, or other type of combination.

Figure 1:
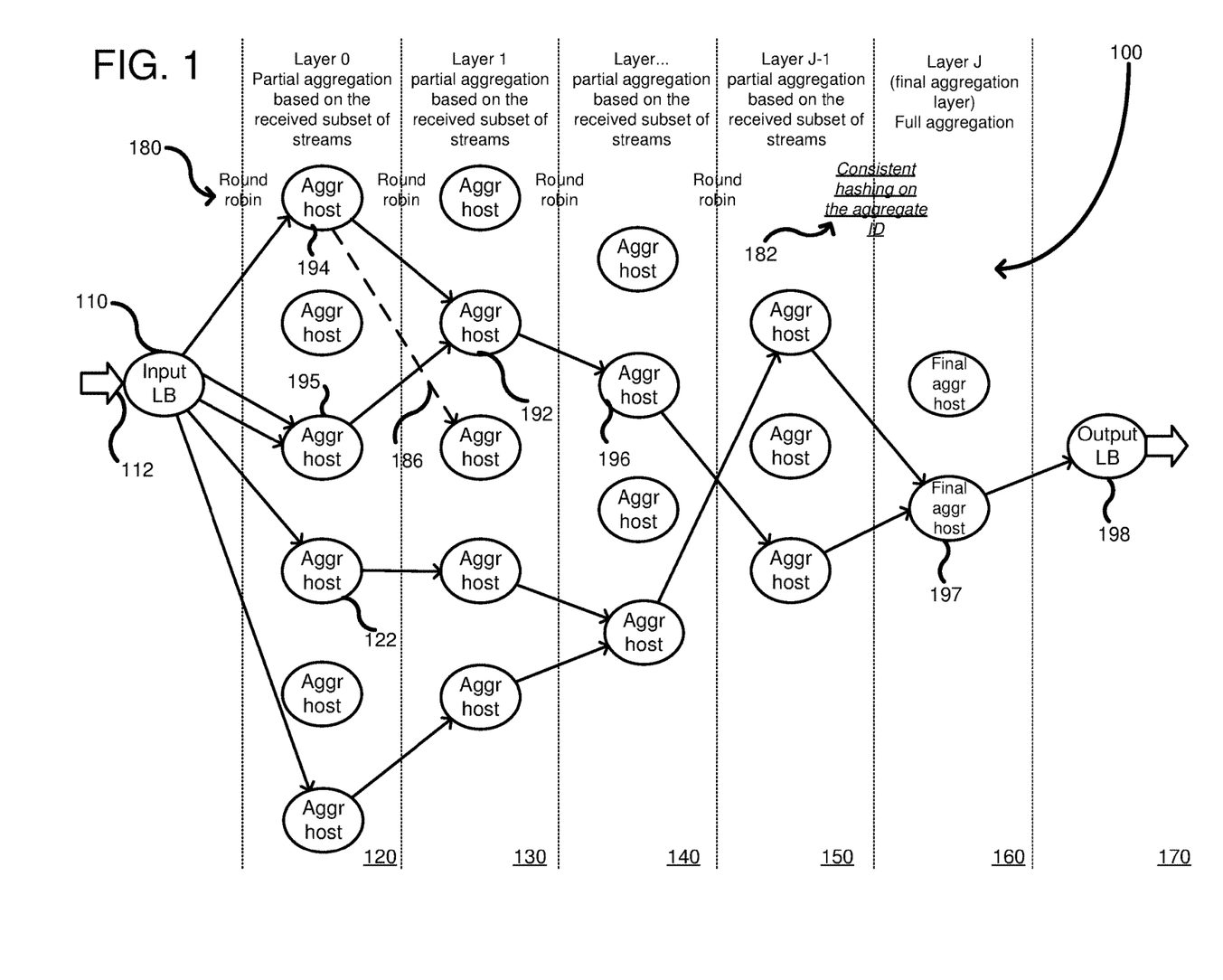
FIG. 1 shows an example multi-layered network used for aggregating multiple input streams.

FIG. 1 shows a multi-layered network 100 including an input load balancer 110 that receives raw metrics 112, from a data center (not shown) or other source, in the form of input streams. The load balancer 110 can distribute the input streams to a plurality of host server computers in an input layer 120, called layer 0. Each host server computer in the input layer 120, such as host server computer 122, is coupled in parallel between the load balancer 110 and a next intermediate layer, such as layer 130. Additional intermediate layers are shown at 130, 140 and 150 before a final output layer 160. Any number of intermediate layers can be used, and each layer includes a plurality of host server computers arranged in parallel between the layers. Additionally, the number of host server computers in any layer can be readily scaled based on the number of input streams. Although not shown, each host server computer in a previous layer can be coupled to each host server computer in a next layer. Thus, a host server computer in a previous layer can transmit its partial aggregate computation to any host server computer in a next layer. However, the host server computers in the multi-layered network 100 are only coupled to host server computers in adjacent layers and generally cannot skip a layer, in the current embodiment. Alternative embodiments can allow host server computers to communicate with other host server computers more than 1 layer removed. The number of host server computers in each subsequent layer is reduced until a number of hosts are used such that all of the partial aggregations can be combined into a single, full aggregation. The decreasing number of host server computers in each layer reflects that the previous layers perform partial aggregations, which reduces the overall number of data streams to aggregate.

Selection of a host in a subsequent layer for transmission of a partial aggregation can be performed using any of a variety of techniques including round-robin, random selection, etc. Typically, a layer before the last layer selects one of multiple host server computers in the last layer using consistent hashing to ensure the partial aggregations of the same type (following the same rules) are directed to a single host computer for the computation of the final aggregation. Additionally, different distribution techniques can be used depending on the layer. Thus, the load balancer 110 can transmit metrics to the input layer 120 based on a round-robin distribution scheme (see 180), while the host server computers in layer 150 can transmit their partial aggregations to the final layer 160 using a consistent hashing distribution scheme (see 182). The consistent hashing is used to ensure that all of the hosts in layer 150 transmit their partial aggregations of the same type to a same host server computer in the final layer 160 so as to calculate the full aggregation. The host server computers on any layer can either retransmit the received partial aggregation if no other partial aggregation is received, or can combine multiple partial aggregations together according to predetermined rules. For example, host server computer 192 combines two partial aggregations from hosts 194, 195 and produces a combined partial aggregation to host server computer 196. However, host server computer 196 does not receive another partial aggregation, so it re-transmits the same received partial aggregation. The arrows show different paths of multiple streams and partial aggregations associated with a same metric as it traverses the multi-layer network. A final host server computer 197 receives the final two partial aggregations, which are combined to produce a full aggregation. The full aggregation is a combination of all the aggregations of the same type received by the multi-layered network 100 from the load balancer 112. The full aggregation can be passed to a load balancer 198, which can then distribute the full aggregation to a monitoring server (not shown). In a failover situation, a host server computer, such as host server computer 194, can detect that the server computer in the next layer is defective and can shift its transmission of a partial aggregation to a different host server computer at the same destination layer. For example, FIG. 1 shows a defective path 186 shown in dashed lines. Thus, host server computer 194 detected the defective connection and redirected its partial aggregation to host server computer 192 as a failover. Thus, the partial aggregations can be re-routed in a failover to other host server computers in the multi-layer network so as to bypass the defective host server computer without impacting the final aggregation produced. Bypassing of the defective host server computer can be considered a failover mode of operation.

Figure 2:
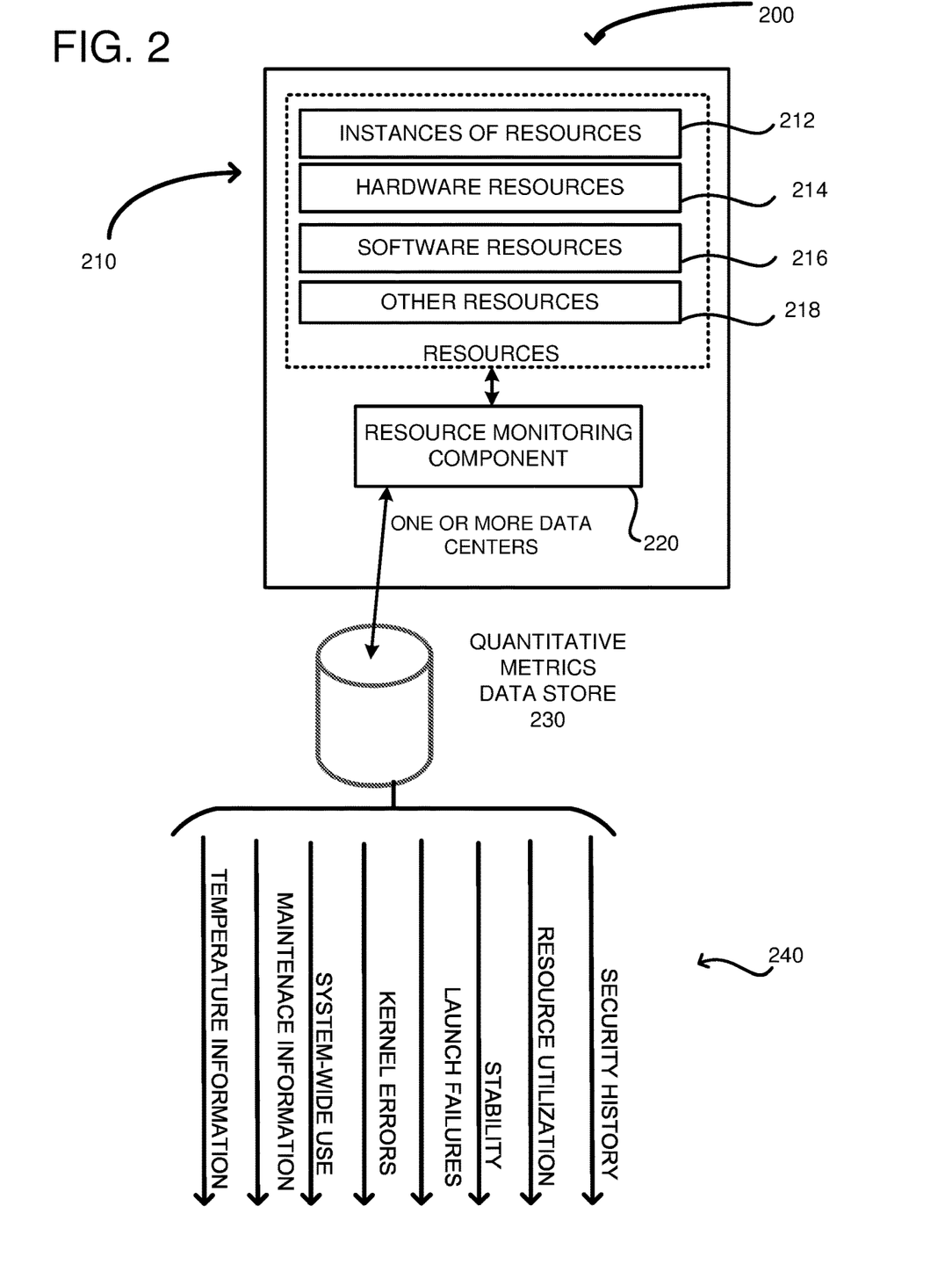
FIG. 2 illustrates an example data center in which the multiple input streams can be generated.

FIG. 2 is a computer system diagram providing an overview description of a mechanism for retrieving metrics in a distributed environment 200, including one or more data centers. In one embodiment, the distributed environment allows users to purchase and utilize resources, shown generally at 210, including virtual machine instances 212, hardware resources 214, software resources 216, and other resources 218, on a permanent or as-needed basis. The resources can include server computers, processor configurations, memory configurations, disk storage, operating systems, network devices, etc. The operator of the distributed environment 200 may charge a fee for operating the instances.

In some implementations, a resource monitoring component 220 executes within or in conjunction with the distributed environment 200 and collects data regarding the state of the resources 210. For example, the resource monitoring component 220 can collect data that describes the usage characteristics of resources 210. In some embodiments, once the data is obtained, the resource monitoring component 220 can store the data in a quantitative metrics data store 230. The data store 230 or the resource monitoring component 220 can allow the collected data to be made available for consumption and use by other components. For example, in some embodiments, the resource monitoring component 220 is configured to expose an application programming interface ("API") or another mechanism through which interested parties can request and receive the data collected for a particular resource 210. It should be appreciated that while the data is discussed herein primarily in the context of data describing the operational state of a resource 210, the quantitative metrics stored in the data store 230 can include other information about a resource 210, such as information describing the configuration of the resource and other aspects of a resource. In this way, the resource monitoring component 220 can be utilized to obtain virtually any type of information about a resource 210 in the distributed environment 200.

Operational metrics 240 can be included in the quantitative metrics store 230 such as, security history, resource utilization, stability, launch failures, kernel errors, system-wide use, maintenance information, temperature, or other parameters, each of which is described below, in turn. The security history can be based on how recently security updates were implemented on the service or software. Additionally, the security history can analyze whether a current version is maintained by the vendor or no longer supported. Such factors affect reliability as out of date software can be susceptible to security breaches. Resource utilization is based on how efficiently a resource footprint is utilized. For example, a smaller resource footprint is a quality indicator of a more efficient service or software. The resource utilization is associated with a quantity of hardware resources used, including CPU usage, memory consumption, packet dropping, percentage of impaired instances on hosts, and storage requirements. Stability is associated with a percentage of time that the service or software is operationally available after being launched and/or the number of restarts that instances require. Operationally available software or services are those functioning normally and can respond to requests. An example of a software or service that is not operationally available is one that has an error condition where it is locked or otherwise stuck. Higher stability is an indicator of overall quality and reliability. Launch failures are associated with a request to launch a new instance of the software or service and an error occurs such that the software or service fails. Kernel errors occur when an operating system detects an internal fatal error, such as one from which it cannot safely recover. System-wide use relates to how many instances of the software or service are running, or how many instance hours have been logged. The system-wide use is typically across multiple tenants in a compute service provider and is an indicator that widely used products are more reliable because of increased opportunity to detect errors. Maintenance information relates to how often updates are installed. Actively maintained software or services are generally considered more reliable.

Figure 3:
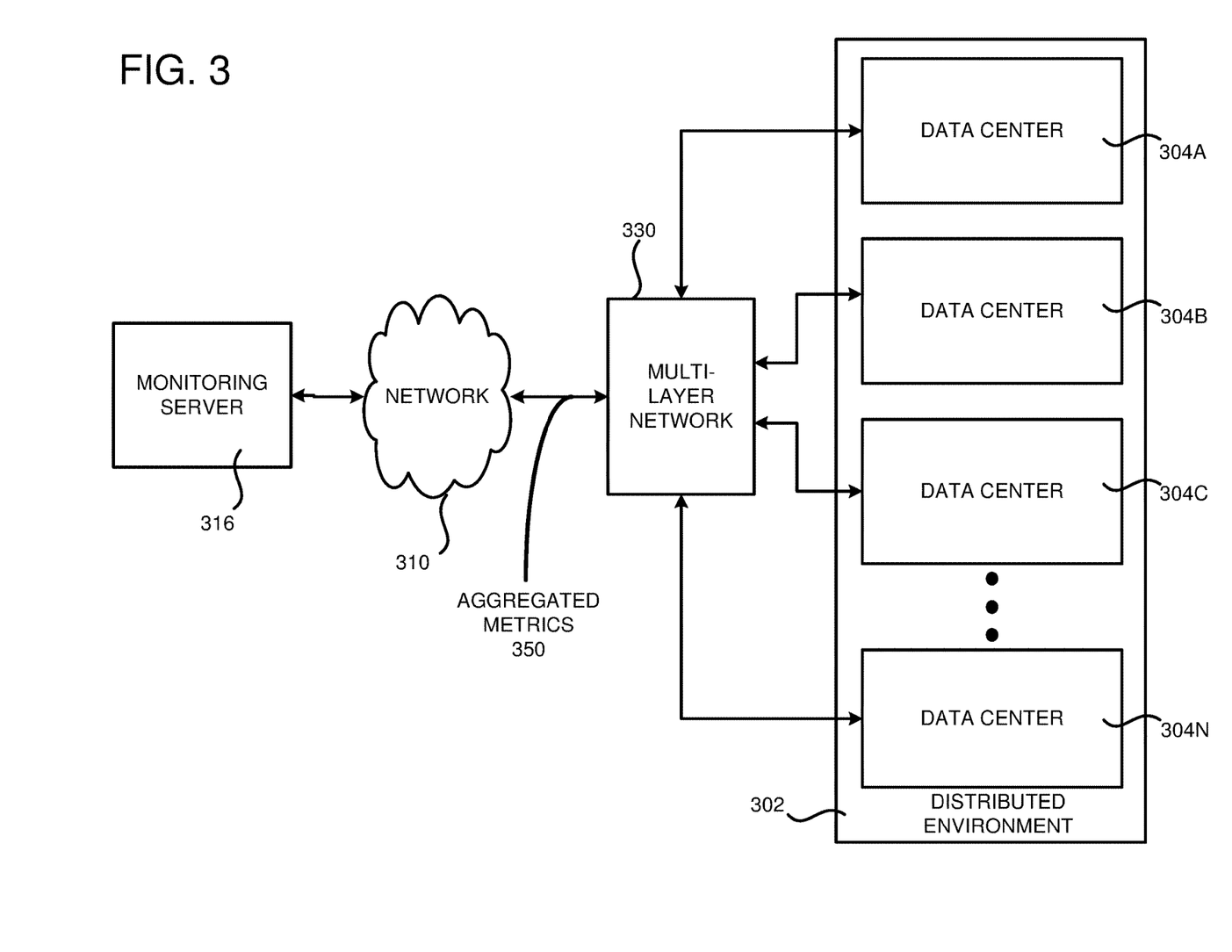
FIG. 3 shows an example of multiple data centers, whose inputs can be combined into the multi-layer network.

FIG. 3 and the following description are intended to provide a brief, general description of a suitable computing environment in which the embodiments described herein may be implemented. In particular, FIG. 3 is a system and network diagram that shows an illustrative operating environment that includes a distributed environment 302. The instances of computing resources provided by the distributed execution environment 302 can include various types of resources, such as data processing resources, data storage resources, networking resources, data communication resources, and the like. Each type of resource may be general-purpose or may be available in a number of specific configurations. For example, instances of data processing resources may be available as virtual machine instances in a number of different configurations. The virtual machine instances can be configured to execute applications, including Web servers, application servers, media servers, database servers, and other types of applications. Instances of data storage resources can include file storage devices, block storage devices, and the like. Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity.

The instances of resources provided by the distributed environment 302 are enabled in one implementation by one or more data centers 304A-304N (which may be referred to herein singularly as "a data center 304" or collectively as "the data centers 304"). The data centers 304 are facilities utilized to house and operate computer systems and associated components. The data centers 304 typically include redundant and backup power, communications, cooling, and security systems. The data centers 304 might also be located in geographically disparate locations. A monitoring server 316 can access the resources provided by the data centers 304 over a suitable data communications network, such as a Wide Area Network ("WAN") 310. Although a WAN 410 is illustrated, it should be appreciated that a local-area network ("LAN"), the Internet, or any other networking topology known in the art that connects the data centers 304 to the monitoring server 316 can be utilized. It should also be appreciated that combinations of such networks might also be utilized.

Positioned intermediate the WAN 310 and the distributed environment 302 can be a multi-layered network 330. In this embodiment, the multi-layered network is positioned outside of the data centers 304 so as to collect data in parallel from the data centers. Additionally, the multi-layered network can be positioned in one or more of the data centers 404. The multi-layer network 330 can receive a wide variety of data streams including metric data from the data centers 304 and provide one or more aggregations as shown at 350. The metric streams can include the streams 240 (FIG. 2) and the multi-layered network 330 can aggregate or combine like metrics from the data centers into a single aggregated stream. In one example, different temperature data can be received from all of the data centers 304 and the multi-layered network 330 can aggregate the temperature data by computing an average temperature. Thus, the aggregation can include the aggregation rules (T1+T2)/2, as one example. Other aggregation rules can apply, such as mathematical operations, counters, statistical operations, etc.

Figure 4:
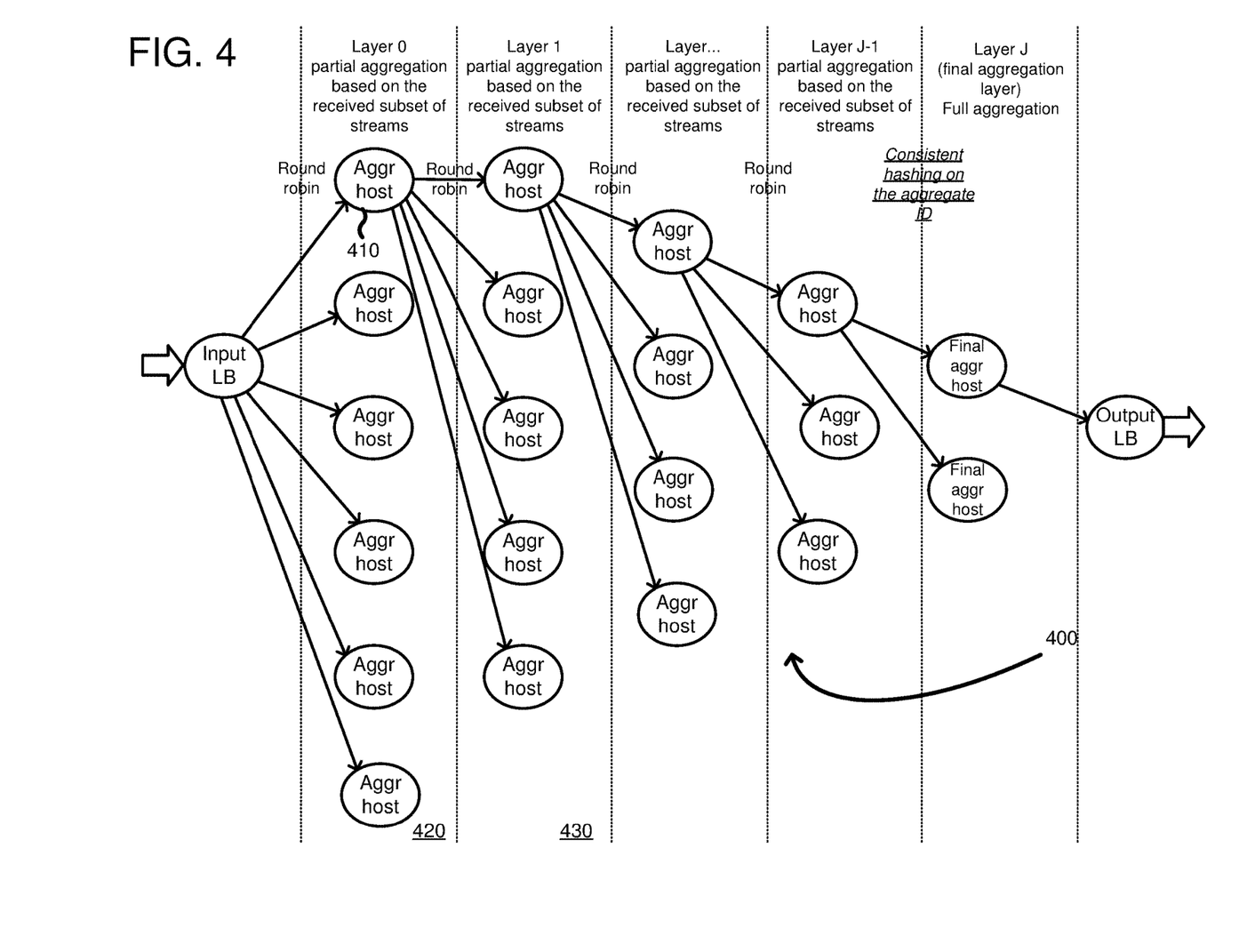
FIG. 4 shows another embodiment of the multi-layered network.

FIG. 4 includes another embodiment of a multi-layered network 400. Unlike FIG. 1, which showed a path of metrics traversing through the multi-layered network, FIG. 4 shows physical connections between a top-most host server computer and other host server computers in a next adjacent layer. Only connections between one host server computer and the next layer are shown in order to simplify the figure. For example, a host server computer 410 of layer 420 is shown coupled to every host server computer in a next layer 430. Thus, when transmitting a partial aggregation to a next layer, the host server computer 410 can transmit the partial aggregations to the host server computers in layer 430 in a round-robin fashion, by transmitting a first partial aggregation to one host server computer in layer 430, and then a second partial aggregation to another host server computer in layer 430, and so on. The other host server computers in layer 420 are likewise coupled to every host server computer in layer 430. The other layers are coupled similarly to the coupling between layer 0 420 and layer 1 430. Thus, every host server computer in every layer is coupled to every host server computer in the next adjacent layer to provide a full mesh of connectivity.

Figure 5:
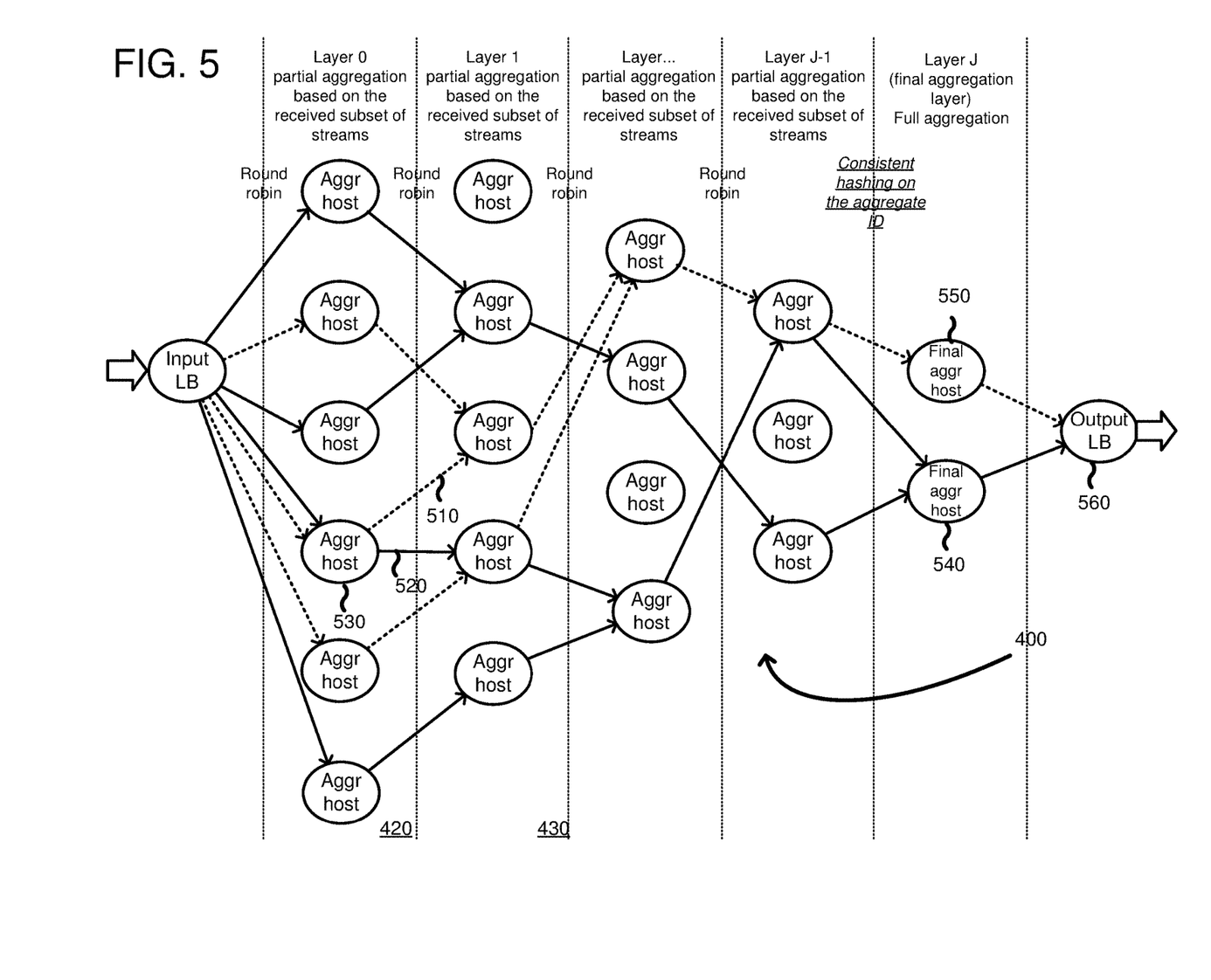
FIG. 5 illustrates an example of how different partial aggregations can traverse the multi-layered network.

FIG. 5 shows two different partial aggregations traversing a multi-layered network, which can be the same multi-layered network as was shown in FIG. 4. When data streams enter layer 0, each stream can include different metric types (e.g., temperature and CPU usage). As a result, each host server computer can extract the different metric types from a same data stream and perform a partial aggregation upon each separately. The data streams are generally a time-stream of events. The data streams can include different metric types, as described above, or each data stream can include just one metric type (e.g., temperature data). Different aggregations can also occur on data of just one metric type. For example, different aggregations of temperature data can be calculated using different rules (e.g., average temperature, median temperature, etc.) The two different partial aggregations, shown in dashed lines at 510 and solid lines at 520, both traverse the multi-layered network independently of the other. As shown, a single host server computer 530 can compute both partial aggregations independently and transmit each partial aggregation independently to different server computers in the next layer. Each aggregation can be associated with a different identifier and can have different round-robin tracking so that the host server 530 transmits the partial aggregations to different server computers in the adjacent layer. Instead of round robin, random distribution can be used. In the intermediate layers of the multi-layer network, the partial aggregations can traverse the multi-layer network in different ways, but the overall load balancing should be maintained so as not to overwhelm any particular host server computer. Each partial aggregation type can pass independently through the multi-layer network until they reach the final layer J, wherein separate host server computers 540, 550 calculate the full aggregations for each type. The full aggregations can then be output to a load balancer 560. It should be noted that a single host server computer, such as host server computer 540, can compute both full aggregations.

Figure 6:
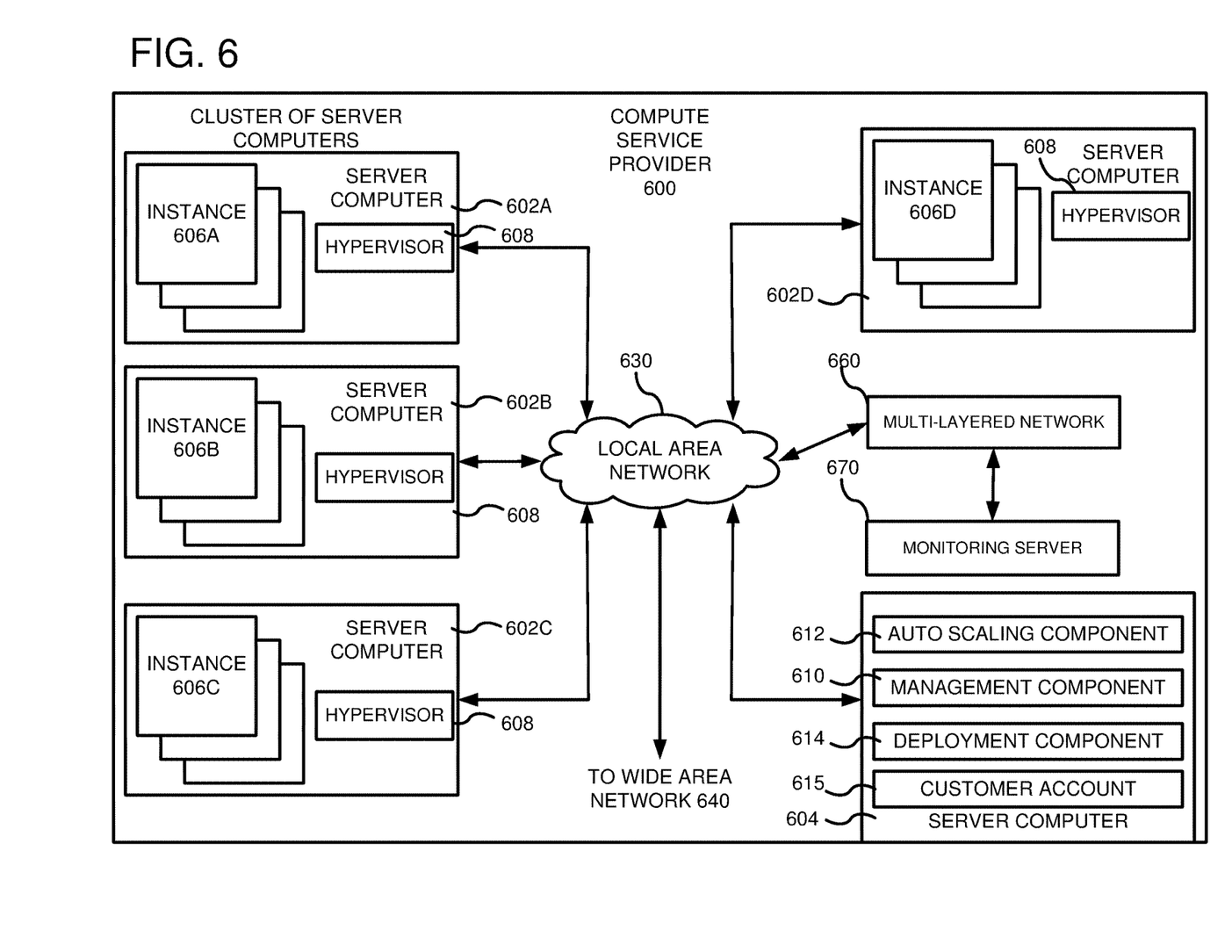
FIG. 6 is an example system diagram showing a plurality of virtual machine instances running in a compute service provider environment with a multi-layered network for aggregating metrics of the compute service provider environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

A multi-layered network 660 can be coupled to the network 630 to receive metrics from the server computers 602A-602D. The multi-layer network 660 can be any of the embodiments described herein, such as those in FIGS. 1, 4 and 5. The multi-layer network 660 can be coupled to a monitoring server 670 that can monitor metrics within the compute service provider environment 600. The multi-layer network 660 can combine varies types of metrics from the compute service provider environment 600, such as from server computers 602A-602D. The metrics can be aggregated by the multi-layered network 660 for passing to the monitoring server computer 670.

Figure 7:
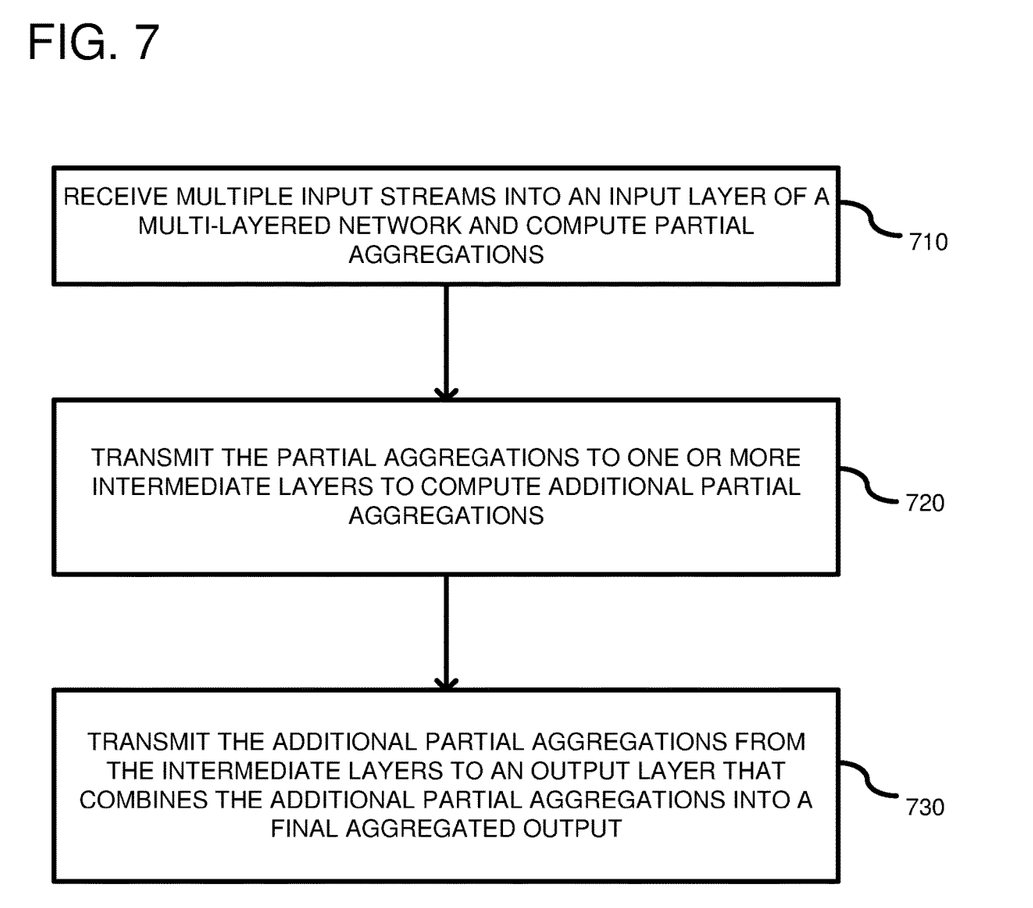
FIG. 7 is a flowchart according to one embodiment for aggregating multiple input streams.

FIG. 7 is a flowchart according to one embodiment for aggregating multiple input streams. In process block 710, multiple input streams are received into an input layer of a multi-layer network. Turning to FIG. 1, the multi-layer network can include a plurality of host server computers with multiple of the host server computers in the input layer 120 receiving input streams from the load balancer 110. As seen in FIG. 1, not every host server computer needs to receive an input stream, as it depends on the number of streams and hosts available. Additionally, the host server computers that receive one or more streams can perform aggregations based on predetermined rules (not shown) stored on the host server computers. However, the aggregations are only "partial" aggregations because not all of the input streams received in the input layer can be combined together for a particular point in time because the streams are received by different host server computers. Consequently, each host server computer that is performing an aggregation is performing a part of the overall final aggregation. The different aggregations performed by the host server computers are computed separately and independently of the other partial aggregations in the same layer. In process block 720, the host server computers transmit the partial aggregations to one or more intermediate layers to compute additional partial aggregations. Additionally, each host server computer can store rules for partial aggregations and final aggregations. Typically, the rules for combining the metrics are the same, but can differ between layers. As shown in FIG. 1, there can be more than one intermediate layer, such as intermediate layers 130, 140, and 150. However, typically, transmission is to a next adjacent layer, which has less host server computers than the previous layer. One or more additional partial aggregations can occur in the intermediate layer. For example, for a host server computer, such as host server computer 192, which receives more than one partial aggregation, it can combine the received partial aggregations to generate a new partial aggregation. The partial aggregations received by the host server computer 192 are in parallel. In process block 730, the partial aggregations from the intermediate layers can be transmitted ultimately to a final output layer that combines the partial aggregations into a final aggregated output. For example, in FIG. 1, the host server computer 197 in the final aggregation layer J 160 combines the partial aggregations into a full aggregation. The final aggregation is a combination of all of the like-kind metrics (i.e., of the same type or having the same rule set) received in the input layer 120 at a time T1 or within an input time period (T1–T2). Another example of a rule that can be applied to a data stream is for a server type. Thus, temperature data associated with a first type of server can be aggregated differently than a second type of server computer. Thus, even like-kind temperature data can be aggregated differently based on other parameters. The transmission to the final aggregation host 197 can be based on a consistent hashing algorithm used on an aggregation identifier associated with the input streams. The use of consistent hashing on the layer prior to the last layer ensures that all partial aggregations that are of the same type (following the same rules), are directed to the same final host for calculation of the full aggregation.

Figure 8:
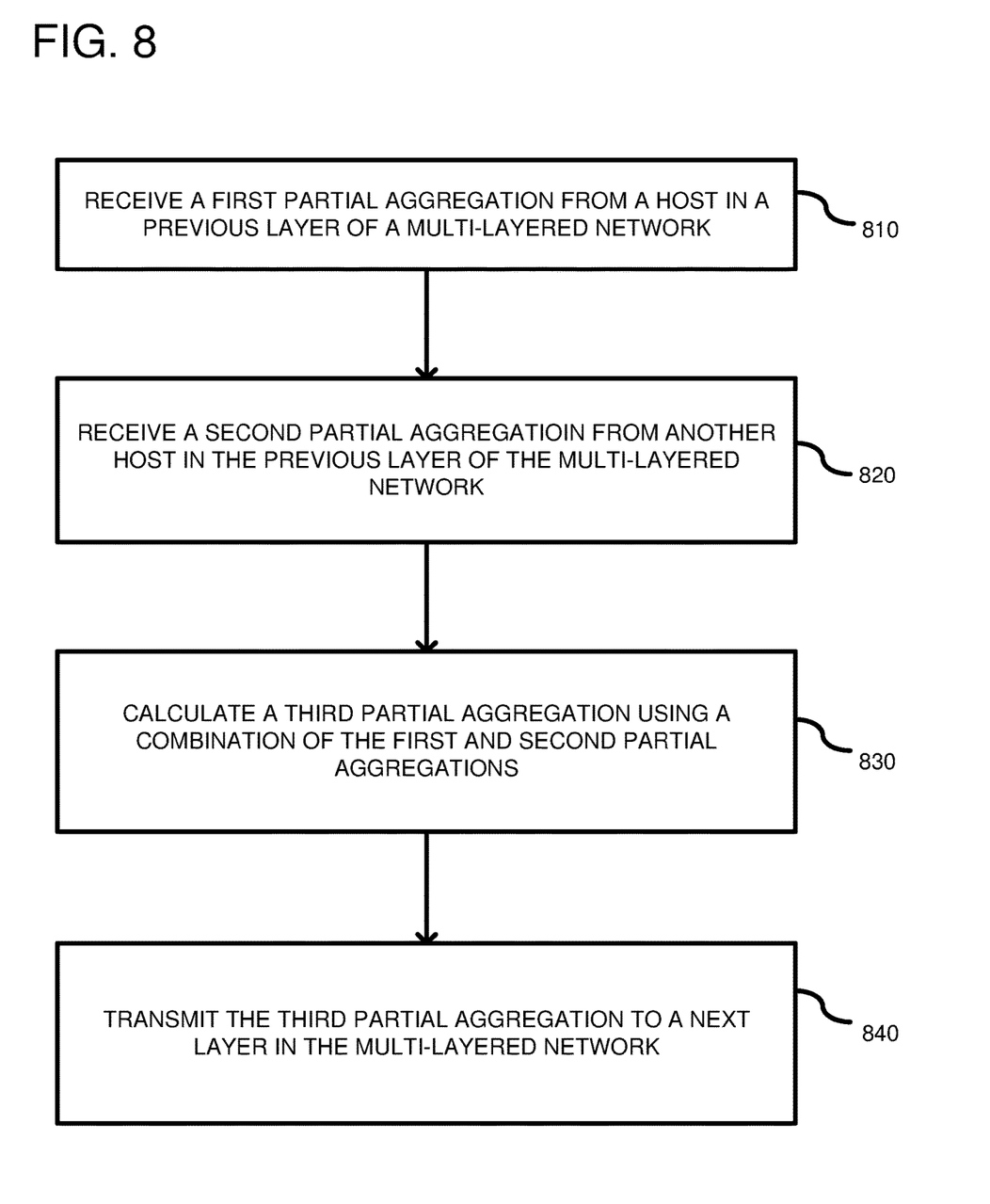
FIG. 8 is a flowchart according to another embodiment for aggregating multiple input streams.

FIG. 8 is a flowchart according to an example method for aggregating. In process block 810, a first partial aggregation is received from a host server computer in a previous layer of a multi-layered network. For example, in FIG. 1, a host server computer 192 receives a first partial aggregation from a host server computer 194. In process block 820, a second partial aggregation is received from another host in the previous layer of the multi-layered network. For example, returning to FIG. 1, the host server computer 192 receives a second aggregation from the host server computer 195. In process block 830, the host server computer can calculate a partial aggregation using a combination of the first and second partial aggregations. For example, in FIG. 1, the aggregation host 192 can calculate a partial aggregation that is a combination of the two partial aggregations received from hosts 194, 195. In process block 840, the calculated partial aggregation can be transmitted to a next layer in the multi-layer network. For example, in FIG. 1, the calculated partial aggregation in host server computer 192 can be transmitted to a next layer 140 in which host server computer 196 resides.

Figure 9:
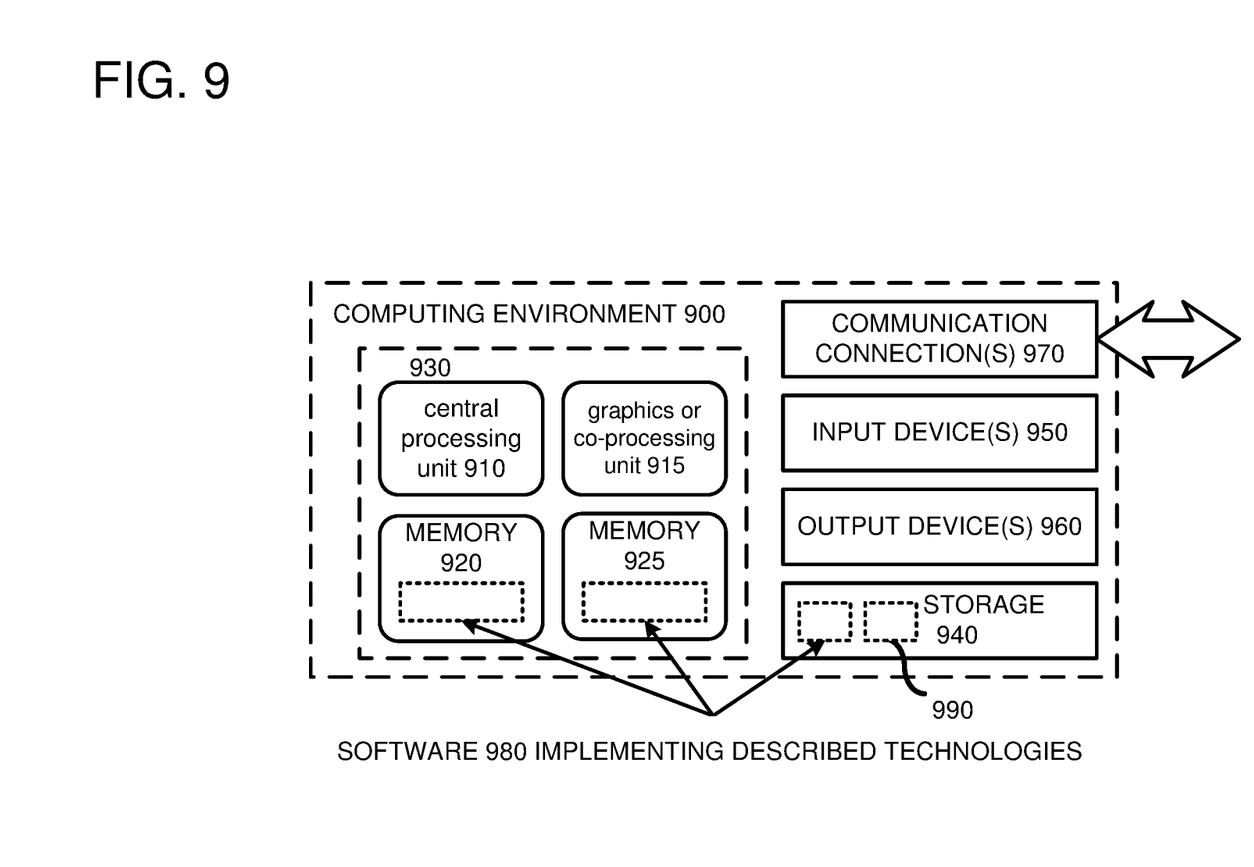
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.). The computing environment 900 can be used as the host server computers in the multi-layered network.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein. The storage 940 can also include rules 990 for performing the aggregations. Such rules can also be stored in the memories 920, 925.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of aggregating multiple input streams in a multi-layered network, the method comprising:
    receiving the multiple input streams in an input layer of the multi-layered network, wherein each successive layer of the multi-layered network includes one or more host server computers, each subsequent layer of the successive layers of the multi-layered network has less host server computers than a previous layer of the subsequent layer, wherein the input layer comprises a plurality of host server computers with multiple of the host server computers receiving a portion of the multiple input streams and computing a partial aggregation on the received portion;
    transmitting the partial aggregations from the host server computers in the input layer to one or more intermediate layers of host server computers in the multi-layered network, wherein the host server computers in the one or more intermediate layers calculate additional partial aggregations, wherein each of the host server computers in the intermediate layers are coupled in parallel to the host server computers in an adjacent layer of the intermediate layers, and wherein each host server computer in the one or more intermediate layers selects a host server computer in the subsequent layer using round robin or random selection, and each host server computer in a layer immediately before an output layer uses a consistent hashing algorithm to select a host server computer in the output layer to ensure all hosts in the layer immediately before the output layer transmit their partial aggregations of a same metric type to a same host server computer in the output layer; and
    transmitting the additional partial aggregations from the one or more intermediate layers to the output layer including a host server computer that combines the additional partial aggregations into a final aggregated output of the multiple input streams.

2. The method of claim 1, wherein the multiple input streams include two or more different aggregation types that are computed separately by the multi-layered network.

3. The method of claim 1, wherein each host server computer stores aggregation rules for computing the partial aggregations, the additional partial aggregations, and the final aggregated output.

4. The method of claim 1, further including detecting that a host server computer in a next layer is defective and bypassing the defective host server computer by transmitting the partial aggregation to a different host server computer in the next layer.

5. The method of claim 1, wherein the output layer includes a host server computer that receives all of the additional partial aggregations produced in the one or more intermediate layers.

6. A method, comprising:
    receiving, in a first host server computer positioned in an intermediate layer of one or more intermediate layers within a multi-layered network, a first partial aggregation from a second host server computer in a previous layer of the one or more intermediate layers of the multi-layered network, wherein each successive layer of the multi-layered network includes one or more host server computers for performing partial aggregations in each subsequent layer, each subsequent layer of the successive layers of the multi-layered network has less host server computers than a previous layer of the subsequent layer, and wherein each host server computer in the one or more intermediate layers selects a host server computer in the subsequent layer using round robin or random selection, and each host server computer in a layer immediately before an output layer uses a consistent hashing algorithm to select a host server computer in the output layer to ensure all hosts in the layer immediately before the output layer transmit their partial aggregations of a same metric type to a same host server computer in the output layer;

receiving, in the first host server computer, a second partial aggregation from a third host server computer in the previous layer;

calculating, in the first host server computer, a third partial aggregation through a combination of the first and second partial aggregations; and transmitting the third partial aggregation to a next layer in the multi-layered network, wherein each of the layers include host server computers coupled in parallel with host server computers in other of the layers.

7. The method of claim 6, wherein the calculating in the first host server computer is based on aggregation rules defining how to combine the first and second partial aggregations.

8. The method of claim 6, wherein the first and second partial aggregations are received by the first host server computer in parallel.

9. The method of claim 6, wherein the first partial aggregation is associated with a first data stream, and wherein the first host server computer computes a second partial aggregation associated with a second data stream, wherein the first and second partial aggregations are aggregations on a different metric type.

10. The method of claim 6, further including detecting that a fourth host server computer in the next layer is defective and re-routing the third partial aggregation to a fifth host server computer in the next layer as a failover.

11. The method of claim 6, wherein the multi-layered network is within a data center and the first, second and third partial aggregations relate to metrics associated with host server computers executing within the data center.

12. A system, comprising:
a multi-layered network of host server computers, with a first layer of host server computers for receiving a plurality of data streams, a successive plurality of intermediate layers of host server computers, and a final layer including at least one host server computer that produces a full aggregation of the plurality of data streams;

each subsequent layer of host server computers having less host server computers than a previous layer;

wherein each host server computer in the first layer and plurality of intermediate layers calculates partial aggregates and the final layer calculates the full aggregation of the plurality of data streams and wherein the intermediate layers of the host server computers are coupled in parallel with each of the host server computers in other of the intermediate layers; and wherein each host server computer in the plurality of intermediate layers selects a host server computer in the subsequent layer using round robin or random selection, and each host server computer in a layer immediately before the final layer uses a consistent hashing algorithm to select a host server computer in the final layer to ensure all hosts in the layer immediately before the final layer transmit their partial aggregations of a same type to a same host server computer in the final layer.

13. The system of claim 12, wherein the multi-layered network computes aggregates of different types and the aggregates of different types are routed differently through the multi-layered network.

14. The system of claim 12, wherein the multi-layered network includes multiple potential paths from the first layer to the final layer and wherein the host server computers are configured to enter a failover mode when one of the host server computers becomes defective by re-routing the partial aggregates to a different host server computer on a next layer.

15. The system of claim 12, wherein the multi-layered network is within a data center and the data streams include metrics associated with the data center.

16. The system of claim 15, wherein the final aggregation is transmitted to a monitoring server computer within the data center.

17. The system of claim 15, wherein each host server computer is configured to select which host server computer in a next layer to transmit to and wherein the selection is made to distribute a load uniformly through the multi-layer network.

* * * * *